Fig. 1

INVENTOR.
KENNETH W. HENSON

INVENTOR.
KENNETH W. HENSON

Aug. 1, 1967     K. W. HENSON     3,333,420
METHOD AND SYSTEM FOR CONTROLLING THE COURSE OF A RIVER
Filed Oct. 5, 1964     5 Sheets-Sheet 4

INVENTOR
KENNETH W. HENSON

ATTORNEY

Aug. 1, 1967  K. W. HENSON  3,333,420
METHOD AND SYSTEM FOR CONTROLLING THE COURSE OF A RIVER
Filed Oct. 5, 1964  5 Sheets-Sheet 5

United States Patent Office 3,333,420
Patented Aug. 1, 1967

3,333,420
METHOD AND SYSTEM FOR CONTROLLING
THE COURSE OF A RIVER
Kenneth W. Henson, Box 35444, Houston, Tex. 77035
Filed Oct. 5, 1964, Ser. No. 403,444
13 Claims. (Cl. 61—3)

The present invention relates to a method and system for controlling the position and contour of the bed of a river so as to predetermine the course of the river, prevent undercutting and erosion of a concave bank, prevent undercutting of man-made objects on and in the bed of the river, and restore banks to a marked degree.

This is a continuation-in-part of application Ser. No. 82,528, entitled, "Method and Apparatus for Minimizing River Bank Erosion," filed Jan. 13, 1961, and now abandoned.

The rivers of the sedimentary plains areas of the middle and southwestern part of this country, for example, have historically been a great threat to man-made structures in the beds of the river and along the banks such as bridges, highways, oil wells, pipelines and the like, because the rivers frequently erode away large chunks of their beds or banks during a single high water stage and at times undergo radical changes in course. Never-ending attempts have been made to protect the river banks and structures thereon and to control to some degree the course of the rivers. The most common method used is to install layer-like protective coverings such as riprap, asphalt, concrete mattress and the like directly on the banks. These measures have been costly and often ineffective because the river tends to undercut the edges of the protective layer and eat away the entire structure. Once a fault is made in the structure, swirling eddy currents having increased flow velocities are established in the fault, and the eroding process is greatly accelerated.

Various types of massive jetties have been placed in the rivers upstream of a bank with intent to either directly shield the bank or to divert and deflect the flow of the river away from the bank. These structures usually result in establishing high velocity, swirling eddy currents at the head end of the jetty, which result in increased erosion of the bank immediately adjacent the deflecting jetty and finally destruction of the jetty. Also, the deflected current frequently begins to erode the opposite bank giving rise to lawsuits from the riparian owner of that bank. In the past, when it has been desired not only to protect a river bank from further erosion, but to reestablish a portion of the bank which has been eroded away, the usual procedure has been to install deflecting jetties upstream from the bank and then mechanically fill the area behind the jetty with local soil. In addition to being expensive, eddy currents established by the deflecting jetties usually quickly reclaim the filled area for the river and undercut and destroy the jetty.

The volume of water flowing through the larger rivers of the sedimentary plains areas of this country varies greatly with the season. During the dry season, only a very small stream of water may flow at a relatively slow speed so that many portions of the riverbed are covered with silt and sand and even the deepest channel or thalweg of the river is sanded up to some degree. However, during high water stage and flood stage, the volume of water greatly increases. This substantially increases the flow velocity such that the bottom of the river is scoured deeper, and the banks along the concave reaches of the river are drastically undercut and sloughed off. Any man-made protective structures on these banks must be installed at low water, and at high water stage these protective structures are often undercut and lost. At high water stage, some of the rivers, such as the Brazos in Texas for example, may be hundreds of feet wide and forty or fifty feet deep. When a stream of this size passes around a sharp bend, there have heretofore been very few man-made structures which have successfully protected the outside or concave bank from further erosion, and no structures have ever successfully moved the deep channel or thalweg of the river back from the outside bank along an extended reach.

It is known that the capacity of water to carry sediment varies with the sixth power of the velocity. Massive permeable concrete piers have been used on the shores of the Great Lakes to cause wind-induced currents to deposit sandy beaches. However, in the many years since this fact was first recognized, this principle has never been applied to the control of rapidly flowing rivers having widely varying flow levels and sharp turns. In fact, all attempts by the U.S. Corps of Engineers to apply this principle in the control of the course of a river along the outside bank of a sharp curve failed, and the further attempts to perfect a system using this principle were abandoned and the system expressly negated.

I have discovered that this principle can be applied to control the contour of the bed and location of the thalweg of a sediment-carrying river, even the larger rivers in the United States. This is accomplished by installing a system of permeable structures on the bed of the river so that the flow velocity of the river in one zone adjacent the bed of the river and below the surface at high water stage is retarded while the velocity in the remaining portion of the river is increased without altering the normal flow path of the current at any point across the river. The control zone is defined by a smooth curve so that no abrupt change will be introduced in the flow path of any portion of the river. Although the current continues to flow along the same general path in both the control zone and the remaining portion of the river, as before the installation, the added resistance in the control zone causes a larger proportion of the current to pass through the uncontrolled portion of the river, thus increasing the depth of the uncontrolled portion. As the flow velocity of the river is reduced in the control zone, the current does not have sufficient hydraulic power to erode the bed, and the material already entrained in the stream is deposited on the bed in the zone of reduced flow velocity. If the control zone is established adjacent a concave bank which tends to be undercut by a deepening thalweg at high water, the thalweg of the river can be moved from adjacent the bank back toward the center of the bed of the river. In addition to generally increased flow velocities in the unretarded zone of the river, the uniform local turbulence produced along the edge of the control zone by the structures assists in scouring out the river bottom and thereby helps to create a new thalweg immediately adjacent and along the edge of the control zone. Thus the new position of the thalweg can be precisely located.

In accordance with a more specific aspect of the invention, the flow velocity of the river in the control zone is reduced by a series of highly permeable structures disposed at right angles to the normal flow path of the water in the control zone. The outer ends of the structures are oriented at uniformly spaced intervals to define a smooth curve and protrude slightly into the stream from the smooth line defining the control zone. The structures are disposed adjacent the bed of the river so that high water will pass over the structures. The outboard ends of the structures protruding beyond the control zone create higher velocity localized turbulence which whips out and scours the bed of the river to form a new thalweg. The structures are preferably elongated and disposed in parallel relationship at spaced intervals in the direction of current flow so that the several structures, although not structurally interconnected, serve to coact against the stream to resist the force of the water. The structures should have between about 40% and about 80% permeability so as not to alter the normal flow path of the current through either the control zone or the remaining portion of the stream. In this regard, the normal flow path is intended to be in relationship to the entire cross section of the river. Of course some local turbulence will be exhibited at each of the structures, particularly at the outboard ends. The structures need not extend to the bank being protected, and relatively large openings may be left in the structures in the interior of the zone so long as the structures define the relatively smooth boundary line of the control zone.

In accordance with a very important aspect of the invention, the permeable structures are installed at low water stage and are made to continuously conform to and follow the riverbed as it is scoured out by high water, particularly along the boundary line defining the control zone, which is disposed adjacent the newly created thalweg. In this way, the course of a larger river may be successfully controlled. More specifically, the structures used for this method comprise highly permeable panels which are held in place against the force of the water by piles driven in the riverbed, yet which are free to sink as the riverbed is cut from beneath the panels. The panels may further be so constructed as to adapt to the contour of the bed of the river.

In accordance with another important aspect of the invention, the novel panels which automatically adjust to changing river conditions may be used individually, in small clusters, or in large systems to control and reshape the contour of the bed of a river in order to protect pipelines buried in the bed of the river, bridge piers rising from the bed in the middle of a river and the like.

Therefore, it is the object of the present invention to provide an improved method for controlling the course of a river.

Another object of the invention is to provide a system for controlling the course of a river.

Another object of the present invention is to provide a practical and inexpensive method for protecting and partially rebuilding a river bank previously undercut and washed away.

Another object of the present invention is to provide an inexpensive structure for reducing the flow velocity of a river to protect a river bank adjacent the structure and to cause deposition adjacent the bank of material carried by the river.

A further object of this invention is to provide a permeable structure which will automatically accommodate itself to changes in the bed of a river so as to establish an equilibrium condition.

Yet another object of the invention is to provide a system by which the method can be carried out to control the course of a river of any size to a degree sufficient to protect a concave bank from undercutting type of erosion.

Still another object of the invention is to provide a structure which may be used individually, in small clusters, or in large systems for controlling erosion of the bed of a river.

Additional objects and advantages will be apparent to those skilled in the art from the following detailed description and drawings wherein.

Figure 1:
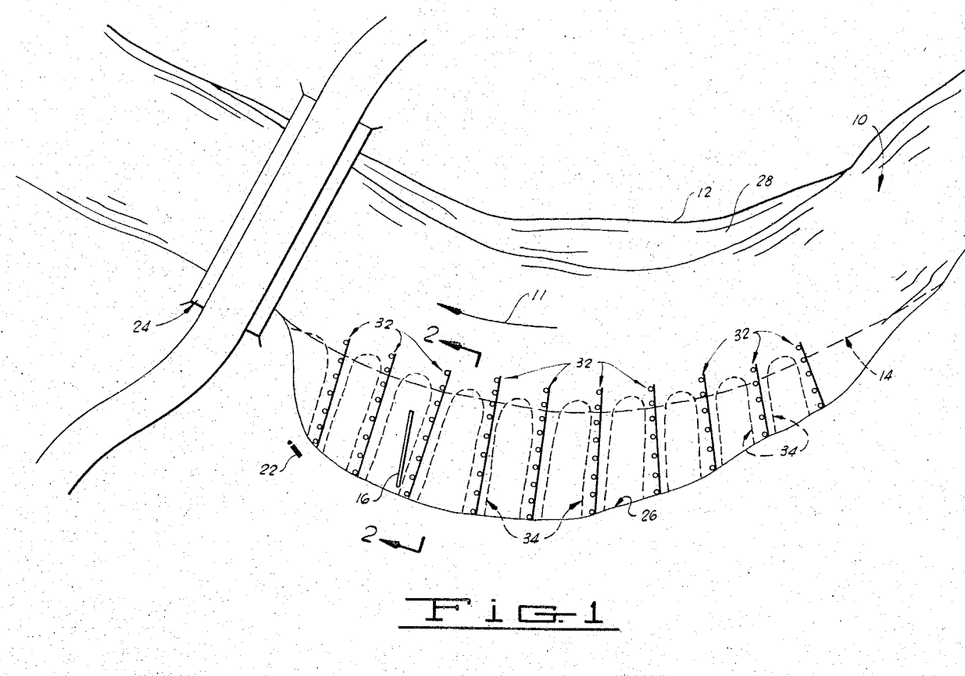
FIGURE 1 is a schematic plan view of a river with typical man-made structures on the bank of the river and a system installation in accordance with the present invention.

Referring now to the drawings, which are schematic and illustrative in nature, a typical river 10 is flowing in a curved path in the direction shown by arrow 11. In all of the drawings illustrating a cross section of a river, the vertical dimension is considerably expanded in order to illustrate the structure involved. At some time in the past, the river was contained during normal flow between a relatively steep, high bank 12 and a similar bank indicated by dotted line 14. The bank indicated by the dotted line 14 is also represented by a dotted line 14 in FIGURE 2. At this time, a pipeline 16, for example, was installed beneath the surface of the ground 18 (see FIGURE 2) and beneath the bed 20 of the river so that the pipeline was completely buried in the earth and protected from the hydraulic effects of the river. An oil well was drilled on the bank of the river at 22 and production established. A bridge 24 was installed to provide a river crossing for vehicles.

Figure 2:
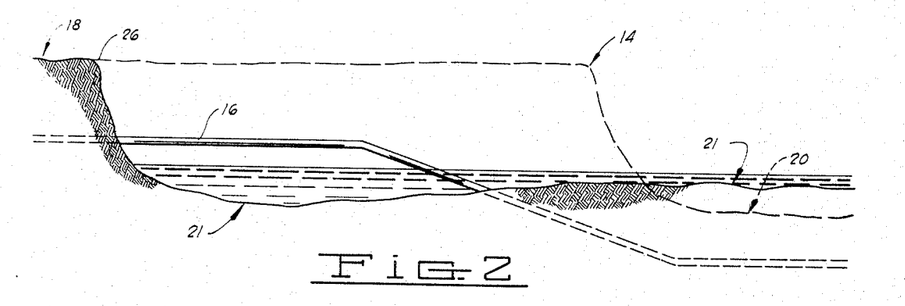
FIGURE 2 is a schematic profile taken on lines 2—2 of FIGURE 1 of the bed and bank of the river prior to the application of the present invention.
Figure 3:
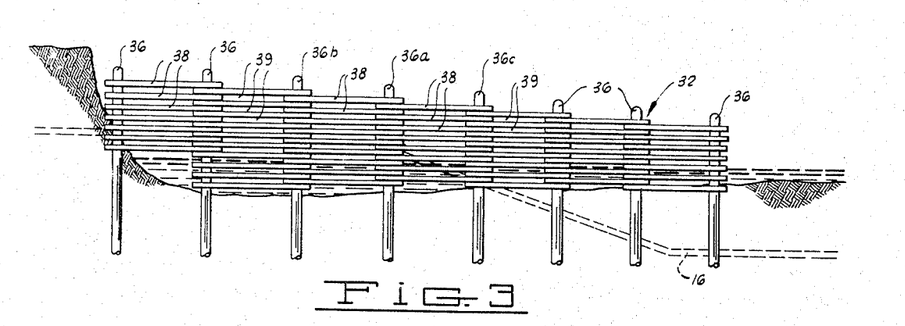
FIGURE 3 is a schematic profile as shown in FIGURE 2 after the system in accordance with the present invention has been installed.

Since the installation of the pipeline 16, oil well 22 and bridge 24, the river has eroded the original bank 14 back to the present steep bank 26 to form the present bed 21, and has deposited a sandbar 28 adjacent the opposite bank 12 so that the deep channel or thalweg of the river has in effect been shifted and directed against bank 26. Previously buried pipeline 16 has now been exposed to the direct effects of the river as shown in FIGURE 2. Due to the increased curvature of the thalweg and the angle at which the major portion of the current strikes bank 26, it is obvious that conditions have been established which are conducive to an accelerated rate of erosion of bank 26 and that the next high water is likely to undercut and erode bank 26, destroying oil well 22 and perhaps bridge 24. It therefore was desirable to not only prevent further erosion of bank 26, but to rebuild bank 26 to bury and protect the now exposed pipeline 16 from the hydraulic forces of the river.

In accordance with the present invention, the current flow through a control zone adjacent the bed of the river in an area surrounding the bank to be protected is impeded to reduce the flow velocity in the control zone. It is important that this be achieved without materially altering the flow path of the current through the zone or through the remaining portion of the river. Although the flow path of the current is not changed, the impedance to current flow through the control zone results in a greater volume of the total flow passing through the portion of the riverbed which is not impeded. This results in an increased flow velocity in the unimpeded zone which deepens the bed and creates a new thalweg. The new thalweg is established along the edge of the control zone and this is facilitated by the local turbulence created along the edge of the control zone by the flow-impeding structures which will presently be described. Since the sedimentary bed of a large river continually changes with the volume of water flowing, it has been found through experience that a static structure is not fully adequate to compensate for the changes occasioned by both the installation of the flow-impeding structures and high water changes. Therefore in accordance with an important aspect of the invention, the structures along the edge of the zone are so constructed as to continually adjust for deepening of the bed after installation of the structures so that a changing equilibrium state for all river stages will be achieved.

In smaller rivers, a system of fixed permeable structures such as illustrated in FIGURES 1–4 may be employed with a reasonable degree of success, although at high water stage the outer ends of the structures have been found to be subject to undercutting and destruction in some cases. In FIGURE 1 the control zone is defined generally by the dotted line 14, which is representative of the position of the original bank, and the now existing bank. It will be noted that the line 14 is a smooth continuation of the bank 26 from a point above the portion of the bank to be protected to a point below the portion of the bank to be protected. Reduction of the flow velocity in the control zone is accomplished by installation of a plurality of highly permeable structures 32 disposed at right angles to normal current flow. Each of the structures 32 extends out toward the middle of the river and is spaced downstream from the preceding structure. Each of the structures 32 may comprise a plurality of wooden planks 38 nailed to the upstream sides of a series of pilings 36 which are aligned normal to the normal flow path of the water so that all pilings 36 are interconnected into a single structure. The planks 38 attached to a typical piling 36a (for example, see FIGURE 3) extend to the pilings 36b and 36c on both sides thereof. It will be noted that the planks extending between pilings 36a and 36b are alternately disposed between and in edge-abutting relation with the planks extending between the pilings 36a and 36c. This construction provides horizontally-extending, elongated openings 39 for current flow to pass through. It will be noted that the openings constitute approximately 40% to 50% of the area of the structures. The permeability of the structures 32 should not be appreciably less than 40%, and may be considerably more permeable, particularly at the upstream end of the control zone and at the portion extending beyond the line 14 so as to reduce the hydraulic force on the structures. Permeabilities as high as 80% are effective to some degree, with about 50%–60% permeability preferred in faster flowing rivers. If the structures are not sufficiently permeable to pass a major portion of the volume normally flowing through the zone, the normal flow path of the water will be altered and will thereby usually be given an increased velocity rather than a decreased velocity.

The structures 32 are more conveniently installed during low water periods so that the planks can easily be connected by nails to the pilings above the water. When it is necessary or desirable to install the planks below the water, the planks 38 can be nailed temporarily at the proper spacing to cross members disposed transversely to planks 38 and these units then lowered on the upstream side of the pilings 36. The force of the river current will hold the planks 38 against the pilings and the weight of the upper planks 38 will force the lower planks 38 under the water. Once the planks are in position, those above the water can be nailed to the pilings to hold the interconnected planks 38 in position. Then those planks below the water can be nailed or otherwise connected to the pilings 36 in any suitable manner. In some cases it may be necessary to build a temporary dirt ramp (not shown) between two adjacent structures to support pile-driving and other crane equipment while the ends of the structures remote from the bank are being constructed, but this will usually be quickly eroded away.

The outer extremities of the structures 32 are the most important part of the system of structures for controlling the velocity within the control zone. The outboard end of each permeable structure 32 is in the zone of maximum local turbulence in the stream. Flood waters tumble over the top and around the end of the structure and combine with the water which has squirted through the structure as the end takes a "bite" out of the portion of the stream which was otherwise unrestrained. Since the outboard ends of the structures are uniformly spaced along a smooth curve, each structure "bites" into the stream to the same extent and thereby creates the same degree of turbulence and causes the same size hole to be "whipped" into the bed of the river at the outboard end of each structure. The interconnection of this series of uniform-sized holes in the riverbed creates a scoured trench or thalweg of uniform depth. The uniformity thus developed continues to direct the current along its previous smooth flow path and prevents the formation of any excessively large eddy currents which would result in uncontrolled erosion. However, in many cases, particularly in larger rivers, the trench thus created at the outboard ends of the structures undercuts the structures and exposes the upper ends of the pilings. The great force on the planks acting on the longer lever then often breaks the pilings off at the lowered riverbed.

The location of the new thalweg may thus be predetermined. It may be located at any of several positions—whichever may best meet the particular engineering requirement—so long as it meets the hydraulic requirement for smooth flow. The successful function of the outboard end of each structure is critical to the establishment and maintenance of the new thalweg. The outboard ends of the permeable structures also form a permeable barrier and the current cannot pass through this barrier into the control zone without being slowed. The interior portions of the structures prevent the acceleration of water in the control zone and tend to slow water which might pass over the preceding structures and scour out the bed of the river by a rolling turbulence. The controlled velocity of the current in the control zone prevents erosion and causes sediment to fill the previous thalweg adjacent the high bank.

If the structures 32 are disposed at substantially right angles to the normal direction of current flow, the current flow will not be altered, but will continue to pass through the permeable structures along substantially the same flow path. As the current passes through each structure, the restrictive openings will cause a venturi effect which momentarily increases the flow velocity of current for a few feet upstream and downstream of each structure 32. However, the overall effect of each structure 32, and in particular the system of structures, is to resist current flow so that the overall flow velocity of the current in the control zone is materially decreased in approximately the area indicated by dotted lines 34 (see FIGURE 1).

As previously mentioned, the structures 32 are spaced apart in the direction of current flow. If the structures are spaced too far apart, the overall effect of the system may not be sufficient to reduce the flow velocity as much as desired. Each of the spaced structures of the system tends to reinforce the other structures against the force of the river. The great mass of relatively slowly-moving water in the control zone exhibits a resistance by reason of its inertia to the entrance of additional high speed current. Thus the downstream structures assist in holding back the volume of water and thereby support the upstream structures. If the structures are spaced too far apart, the structures become more vulnerable to destruction by the force of the current. Spacing of forty feet between adjacent structures 32 in a system such as shown in FIGURE 1 has proven satisfactory.

The structures 32 must have a relatively high permeable-to-current flow so that the normal flow path of the current will not be significantly disrupted. As the percentage of open area in each structure decreases, the likelihood that current will be deflected is increased because all the current engaging each structure cannot pass through, but must be deflected around the end of the structure. Also, if each of the structures 32 is not sufficiently permeable, the force of the current may destroy the structure. However, each structure 32 must be sufficiently resistive to flow to decrease the downstream current velocity.

It is also to be understood that while the particular permeable structure 32 disclosed is considered to be a preferred embodiment because it is economical, other elongated structures having variously-shaped apertures to pass current flow can be used. The primary requirement is that the permeable srtuctures reduce the flow velocity of the current by offering resistance to flow without altering the normal flow path of the current when placed in the riverbed in accordance with the present invention.

In the illustrated application of the present invention, as the river current approaches the control zone wherein the system of structures 32 have been installed, the current normally will be transporting a maximum quantity of soil particles for the particular flow velocity existing upstream of the structures. After the current enters the control zone, the flow velocity is reduced by the series of highly permeable structures and the current does not have the capacity to transport additional material from bank 26 and therefore cannot erode bank 26. Instead, the excess soil particles being transported by the current at the previous high velocity are dropped from the current and deposited in the areas 34 of reduced flow velocity between the permeable structures 32 to form deposits similar to sandbars.

Figure 4:
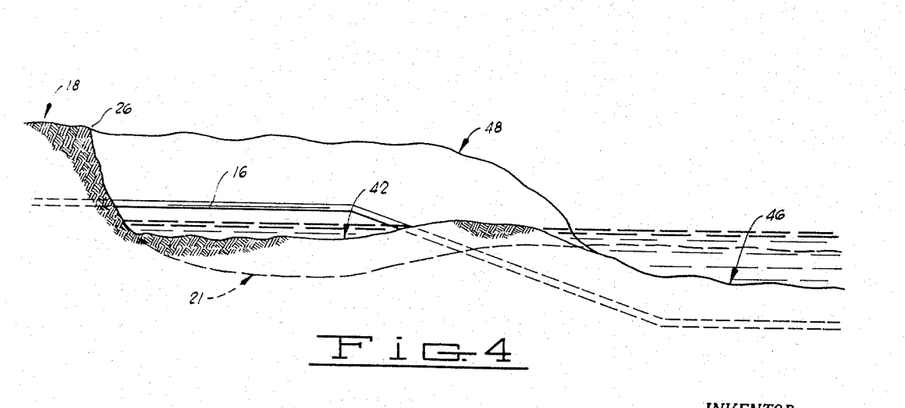
FIGURE 4 is a schematic profile similar to FIGURE 2 and shows the results which can be expected by application of the present invention.

During the first rise of the river after installation of the structures, deposition in areas 34 will reach a depth indicated by line 42, for example, in FIGURE 4. Initially deposition will not occur a few feet in front and a few feet in back of the permeable structures due to the higher flow velocities created as the current passes through the restrictive openings 39. Since the total resistance to current flow is considearbly less in the area between the ends of the structures and the opposite bank 12 than in the control zone, a larger portion of the total volume of the current will tend to pass between the ends of the structures and the opposite bank. However the flow path of the water through either the control zone or the other portion of the river will not be noticeably altered. This increased volume will increase the flow velocity of the current between the ends of the structures and bank 12 and will erode the sandbar 28 and the bed 21 down to perhaps line 46 of FIGURE 4. The increased turbulence at the outboard ends of the structure will assist in scouring a trench for the new thalweg of the river which will then be located along the edge of the control zone. As the bed 21 and sandbar 28 are eroded, the re-opened channel will be widened and deepened, and the volume and flow velocity of the current flowing in the unrestricted part of the river channel will be further increased, which in turn increases the rate of erosion of the bed and the sandbar 28. At the same time the volume of water passing through the control zone will decrease, which causes the flow velocity in the control zone to decrease even more, which in turn increases the rate of buildup of the soil depositions in areas 34.

During subsequent low water periods, the predominant portion of the current will pass through the deepened portion 46 of the riverbed. As the water begins to rise during the next high water period, the initial flow velocity through the structures will be very slow and the soil particles will begin to deposit at the base of each structure. After several high water periods, additional structures may be installed on the previous sand deposits so that the ultimate deposits may be built up to the height indicated by line 48 of FIGURE 4 over substantially the entire control zone. However, the ends of the structures 32 will aways protrude into the high velocity portion of the river to establish an equilibrium condition. During low water, the bed at the structures may be relatively shallow and the structures sanded in. However, during high water periods, the bed will be deepened and the ends of the structure 32 exposed to a considerable extent until an equilibrium condition is established. In some cases, the ends of the structures have been undercut and broken away by the force of the current, in which case the structures must be rebuilt in order to regain control of the current.

Figure 5:
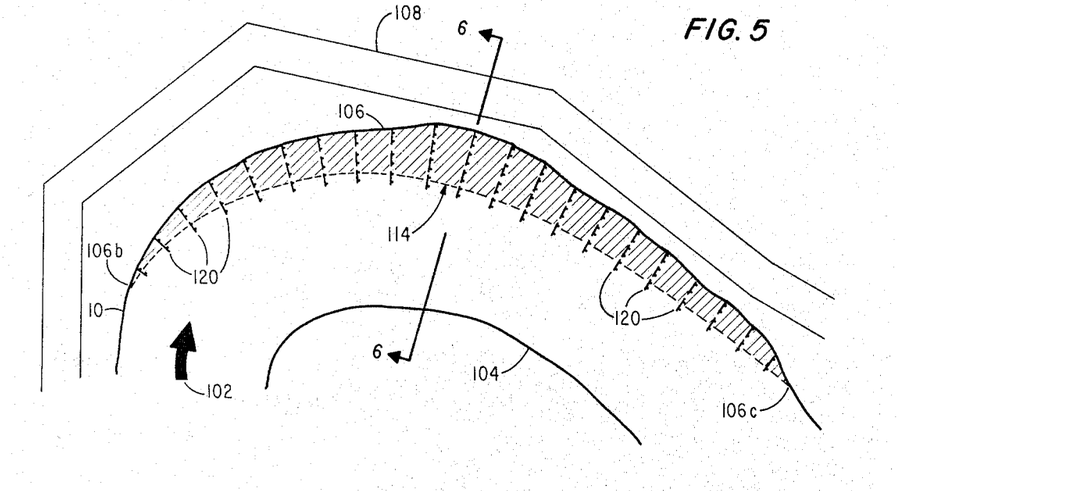
FIGURE 5 is a schematic plan view of a sharp bend in a large river which serves to illustrate the method and system of the present invention.
Figure 6:
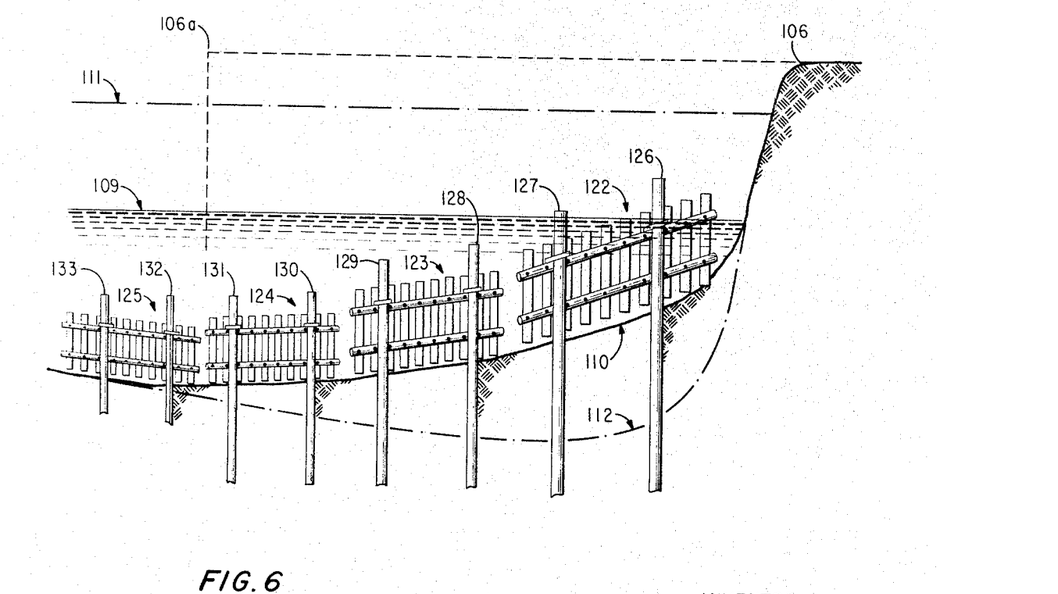
FIGURE 6 is a sectional view taken substantially on lines 6—6 of FIGURE 5.

In accordance with an important aspect of the invention, the highly permeable structures for impeding flow are so constructed as to accommodate the changing conditions of the riverbed after installation in order to produce better control of the current and also reduce damage to the structures during high water. This method and sturcture is illustrated in FIGURES 5–9. Referring now to FIGURE 5, a large river is illustrated as flowing in the direction of arrow 102 between relatively high inner and outer banks 104 and 106, respectively. A fresh water canal 108 extends along the high bank 106. At the time the canal 108 was dug, the bank 106 extended to the position 106a illustrated by the dotted outline in the sectional view of FIGURE 6, but has since been eroded away. During low water stage, the water may flow at a level 109, as illustrated in FIGURE 6, and the bed of the river adjacent the concave bank 106 might then be generally along the solid line 110. At low water the depth of the river might be from ten to twenty feet. However, when the water is at a high level 111, for example, the increased flow velocity will customarily erode the sedimentary bed down to the dotted line 112 so that the total depth may exceed forty or fifty feet. During the high water stage, and in particular during flood stage, the deepening thalweg immediately adjacently the high outside bank 106 tends to undercut the bank 106, such that it will subsequently cave off into the river and be carried away. Since very little erosion occurs at low water, it has heretofore been the practice to shield the bank above the low water level in order to counteract the erosion of the bank at high water. However, protecting the bank itself is of little use because the deepening of the thalweg at high water level undercuts both the protective structure and the bank and both are usually lost.

In accordance with the present invention, the flow velocity of the water in an entire control zone adjacent the bottom 110 in the very deepest part of the river is retarded without changing the normal course of the water. The control zone may be defined by a smoothly-curved dotted line 114 which extends as a smooth continuation from the bank 106 at a point 106b upstream from the portion of the bank to be protected, and extends upwardly from the bed of the river to a point below the surface at high water. The line 114 should be a smooth continuation of the bank, or a smooth deviation from the normal flow path, so as to prevent large swirling eddy currents at either the beginning or end of the control zone or at any point in between. In this regard, large swirling eddy currents would be considered the currents flowing in large horizontal circles which are significant departures from the normal flow path and should be distinguished from local turbulence which is created immediately adjacent the ends of the structures.

The velocity of the current in the control zone is reduced by means of a flow control system comprised of a large number of highly permeable structures 120 each of which is disposed at substantially right angles to the normal flow path of the current in the zone prior to installation so that the normal flow path is not altered, but merely slowed. Each of the structures 120 of the control system is preferably comprised of a series of permeable panels 122, 123, 124 and 125 which are held in position by a series of spaced pilings 126, 127, 128, 129, 130, 131, 132 and 133 driven into the riverbed. The highly permeable panels 122–125 are aligned generally in end-to-end relationship so as to provide a substantially continuous structure extending at right angles to the normal current flow.

In accordance with a very important aspect of the present invention, the outboard panels 125, and preferably the other panels, of each of the structures 120 is adapted to follow the bed of the river downwardly during subsequent high water periods until an equilibrium condition is reached. This may be accomplished by constructing these panels is illustrated by the panel 135 in FIGURES 7–9. The panel 135 is comprised of a plurality of vertical planks 134 which are connected to horizontal members 136 and 138. The planks 134 may conveniently be 3 x 8 inch wooden planks, eight to twelve feet in length, and the horizontal members 136 and 138 may conveniently be comprised of lengths of 7-inch diameter pipe, for example. The vertical members 134 are spaced so as to give the desired degree of permeability greater than about 40%, preferably in the range from 50%–60%, and are pivotally connected to each of the horizontal pipes 136 and 138 by single bolts 140 and 142, respectively, so that the structure may be de-formed to the position illustrated in FIGURE 9 for purposes which will presently be described. The panel 135 is weighted, by additional weights (not illustrated) if the pipes 136 and 138 are inadequate, so that it will sink when placed in the water. The panel 135 is placed on the upstream side of the two piles 148 and 150 and is loosely connected to the piles by frames 144 and 146 so that the panel will slide downwardly along the pilings and rest on the bed of the river at all times for purposes which will presently be described.

Figure 7:
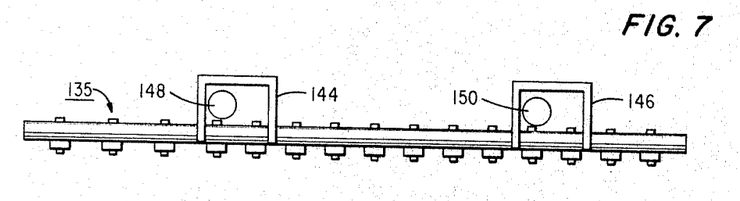
FIGURE 7 is a top view of one panel of the structure illustrated in FIGURE 6.
Figure 8:
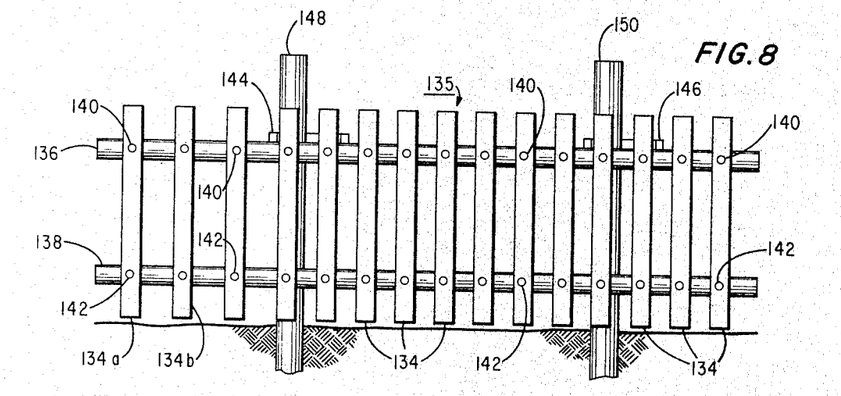
FIGURE 8 is a front elevation of the panel illustrated in FIGURE 7.
Figure 9:
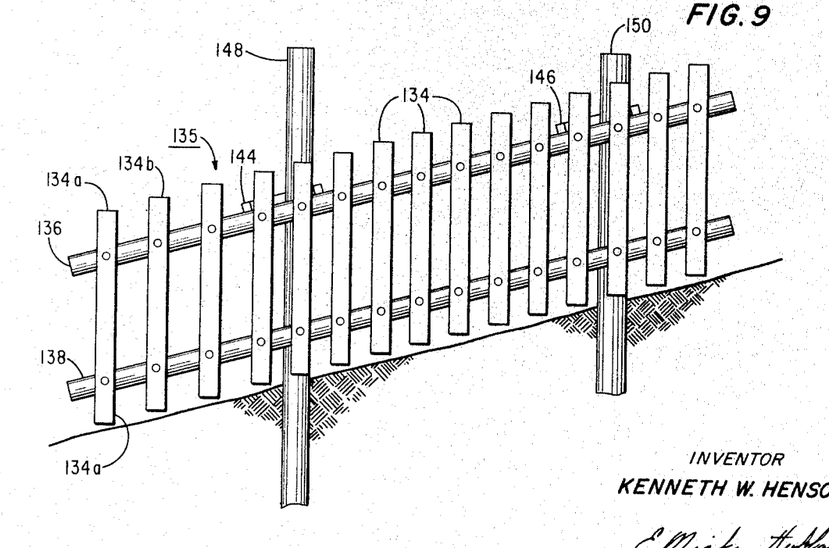
FIGURE 9 is a front elevation of the panel of FIGURE 8 illustrating the operation of the panel.

As mentioned, it is particularly desirable that the outer panel 125 be loosely interconnected as illustrated in panel 135 so as to form a parallelogram which will de-form, and that at least the outboard end be loosely connected to the piling 133 as illustrated in FIGURES 7, 8 and 9 so that it will follow the bed of the river. It is also desirable that the inboard panels 122–124 be constructed in the same manner and also be loosely interconnected and slidably attached to the respective pilings, but these panels may be rigidly connected to the pilings and therefore rigidly positioned relative to the bed 110 in many cases.

It will be noted that some of the panels in the section illustrated in FIGURE 6 lie wholly beneath even the low water line which may be up to twenty feet in depth. It is preferable that neither the panels 122–125 nor the pilings 126–133 protrude above the high water level so that drift will not hang up on the structures. The only zone of importance is the zone adjacent the bed of the river, and the height of the panels and therefore the height of the control zone above the bed will depend upon the permeability of the panels and the downstream spacing. It is important that a sufficient volume of water flow through the panels to maintain essentially laminar flow and prevent tumbling turbulence over the tops of the panels. The panels may be graduated in height from the river bank to the outer panel 125 as illustrated in FIGURE 6, and may also be graduated from a minimum permeability adjacent the bank to a maximum permeability at the outer panel 125. In this regard, the outer panel 125 may itself be more permeable at the outer end as illustrated by the greater spacing between the vertical planks 134a and 134b in FIGURES 8 and 9.

The control system of permeable structures may be installed at low water by first driving the pilings 126–133 into the bed of the river. The panels 122–125 are then placed on the upstream side of the pilings and coupled to the pilings by the brackets 144 and 146. When the panels are released, they sink to the bed of the river and automatically conform to the contour of the bed at that time. This construction permits the panels to be easily installed in water substantially deeper than the height of the panels. It should be borne in mind that the deepest portion of the river is almost invariably the portion which is to be retarded by the method and the system of the present invention, and the pilings may be driven in very deep water completely below the surface of the water by conventional engineering techniques.

As the system of structures is installed and immediately thereafter, even at low water stage, the outboard panels 125 tend to be undercut as a result of the increased flow velocity through the portions of the river outside the control zone. The loosely connected panels 125 continue to sink as they are undercut and conform to the new bed of the river. During the next high water after installation of the control system, the velocity of the current in the control zone will be substantially retarded. However, the velocity adjacent the outboard panels will be increased and this increase together with the local turbulence adjacent the outboard ends of the outboard panels deepens the bed to form a new thalweg for the river. Due to the increased velocity immediately adjacent to the interior panels resulting from the water jetting through the restrictive openings, the interior panels may initially tend to be undercut. However, as the panels are undercut, they automatically slide down the pilings and adjust to the contour of the bed 110 so as to remain in operative position immediately adjacent the bed. Within a very short time after each change in velocity due to a rise or decline in the river, a new equilibrium condition will be established by the panels. As the velocity increases, the panels tend to be undercut and lower. As the flow velocity of the river decreases, the panels tend to be sanded in. However, once the panels have reached a maximum depth as a result of a maximum velocity, they will not be lowered further. The overall effect is a significantly reduced flow velocity in the control zone which results in the deposition of sediment between the structures 120 as heretofore described and the movement of the thalweg from adjacent the high bank out to the edge of the line 114. As the thalweg is relocated along the edge of the control zone, the outer panel 125 will customarily be undercut to a material degree, but will continue to conform to the contour of the bed so as to prevent undercutting of the other panels. Since the panels continue to be disposed on the bed of the river, the length of piling between the bed and the panels remains constant so that the force of the river on the panel is not sufficient to break the piling. Thus the bank 106 cannot be undercut by deepening of the bed 110 and will not be eroded from direct washing because of the reduced flow velocity.

Experience has demonstrated that the series of outboard panels 125 are predominant in achieving the desired slowing of the current in the control zone. The outboard panels are disposed normal to the current flow at points spaced along the line 114 from the bank upstream from the region of the bank to be protected to a point downstream of the region such that water cannot enter the control zone without passing through an outboard panel at a right angle to the panel. Although it is preferred that the panels within the interior of the control zone be substantially as illustrated to prevent acceleration of the water within the zone, such as by tumbling over the tops of the panels and establishing rolling turbulence, the construction and placement of the inboard panels is not highly critical. The ends of the inboard panels may be spaced apart to some degree and need not extend up to the high bank 106.

Figures 10, 11, 12:
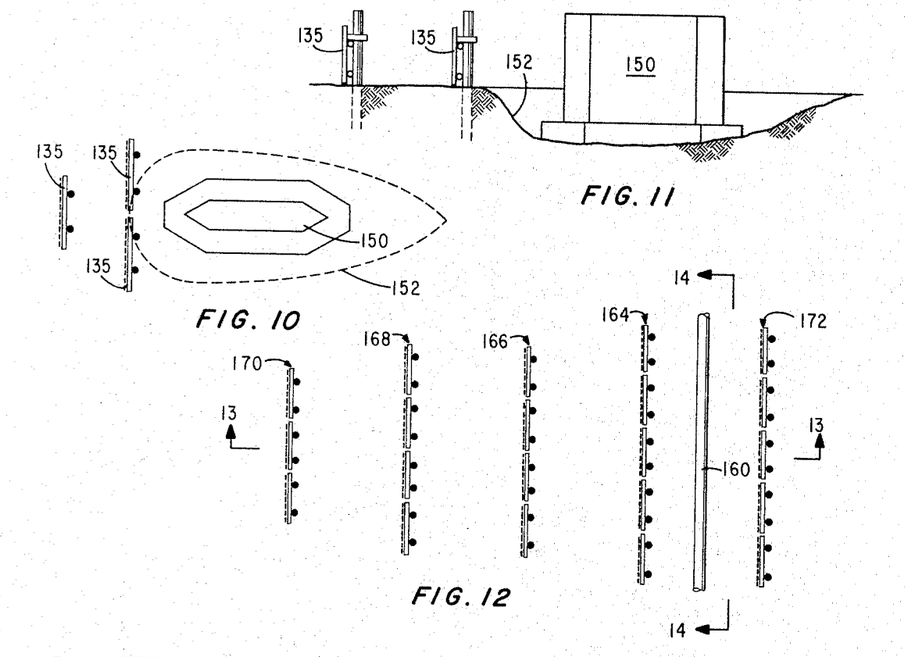
FIGURE 10 is a schematic plan view illustrating a cluster of panels for protecting a bridge pier.
FIGURE 11 is a side view of the cluster of FIGURE 10.
FIGURE 12 is a plan view of a system of panels for protecting a pipeline in the bed of a river.

Due to the fact that the novel panel 135 continually conforms to the bed of the river under changing current velocity conditions, it is uniquely adapted to be used singly or in small clusters on the bed of the river to protect various structures. For example, as illustrated in FIGURES 10 and 11, a bridge pier 150 rising from the sedimentary bed of a river tends to increase the current on each side of the pier, causing a deep eroded channel 152 extending around the front of the pier and downwardly along each side. This channel tends to deepen during high water and on occasion may undercut the pier to such an extent as to cause failure of the bridge. To counteract and correct such an undesirable condition, a cluster of panels 135 may be arranged on the bed of the river in a pattern somewhat as illustrated in FIGURES 10 and 11. The panels 153 maybe eight to twelve feet in height and constructed as previously described. The panels 135 may be positioned on the bed of the river at 40 to 50 foot intervals and disposed at right angles to the normal current flow so that the flow path will not be altered.

The cluster of panels 135 will then retard the flow velocity of the water adjacent the pier 150 to prevent undercutting, and will usually cause a sedimentary fill. The panels, particularly the outboard ends, will continually adjust to the changing bed until an equilibrium condition is achieved. It will usually be necessary to dispose the panels only upstream of the pier, but if desired, additional panels may be positioned at each side of the pier to insure that the flow velocity is sufficiently reduced. Due to the fact that the panels continually lower if the river undercuts the panels, the pilings are not subjected to a high leverage force and can therefore withstand considerable current pressure. Further, the panels are highly permeable, in excess of 40% openings as previously described, and may be made as permeable as required in order to insure that too much force is not applied to the supporting pilings. Although the panel 135 described is particularly adapted for the use specified, panels of other construction may be utilized in accordance with the broader aspect of the invention. In particular permeable panels may be provided with a base to prevent tipping and may be retained in position against the force of the current by means other than the pilings. For example, the panel may be held in place by cables connected to the respective panels by a bridle and extending upstream to a piling driven in the bed of the river.

Figure 13:
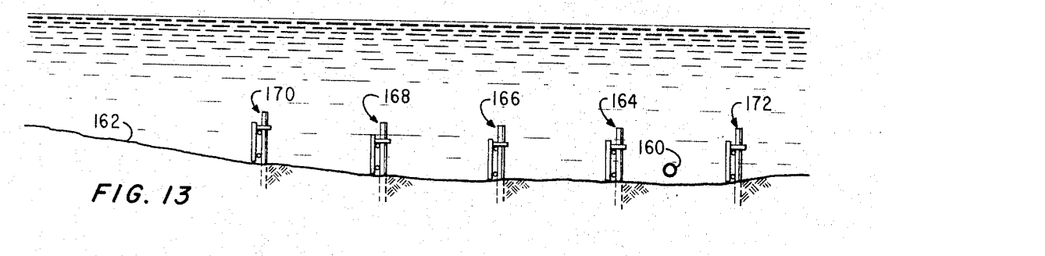
FIGURE 13 is a sectional view taken on lines 13—13 of FIGURE 12.
Figure 14:
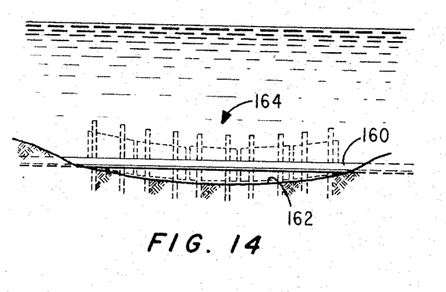
FIGURE 14 is a sectional view taken on lines 14—14 of FIGURE 12.

Another example of the use of the novel panels 135 is illustrated in FIGURES 12, 13 and 14 wherein a system of the panels is used to protect a pipeline 160 in the bed of a river. More specifically, the pipeline 160 may have been originally buried in the bed of a very large river which may be several hundred to several thousand feet in width and 30 to 70 feet in depth at low water stage. Due to changing conditions, a portion of a pipeline may have become exposed, such as by a longitudinally-extending trough 162 cut in the bed as illustrated in FIGURES 13 and 14. It is desired to cover and protect the exposed portion of the pipeline 160 with sediment. This may be accomplished by placing a system of the panels 135 on the bed of the river in advance of the exposed portion of the pipeline. For example, a row 164 may be formed from five panels 135 disposed in end-to-end relationship at right angles to the current flow. Second, third and fourth rows 166, 168 and 170 may be positioned upstream from the row 164 at approximately 50-foot intervals. A fifth row 172 may be positioned downstream of the pipeline 160 if desired. The panels may be installed on the bed of a river of considerable depth by using extensions to drive the pilings. The panels may be lowered into place using the extensions as a guide. The panels will automatically conform to the bed of the river and will remain on the bed of the river during changing velocity conditions as previously described. The flow velocity of the current in the zone of the system of panels will be sufficiently slowed to cause deposition of current to recover the exposed portion of the pipeline 160.

Figure 15:
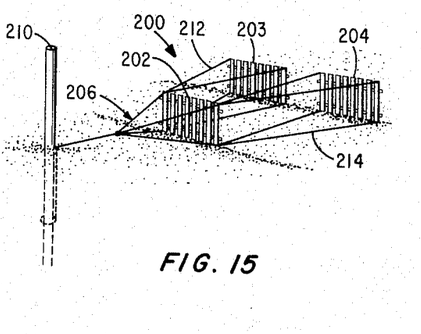
FIGURE 15 is a perspective view of another device constructed in accordance with the present invention.

Other permeable structures may be used to retard the flow velocity and may be anchored in position by cables extending to the bank or bed. Such a structure is illustrated in FIGURE 15 and designated by the reference numeral 200. The structure 200 is comprised of three panels 202, 203 and 204 which may be constructed similar to the panels 135 except that the elongated members 136 and 138 need not be pivotally connected to the cross members 134 since the panels are preferably rigid. The upstream panel 202 is secured in position by a cable bridle 206 which is connected to the four corners of the panel 202 and is anchored below the bed 208 to a piling 210 driven upstream. The downstream panels 203 and 204 are connected to the panel 202 by cable bridles 212 and 214, respectively. The cable bridles are so formed as to maintain each of the panels 202-204 upright and at right angles to the current flow. The weight of the panels, together with the fact that the cable bridle 206 is connected to the piling 210 at the surface of the bed, keeps the panels on the bed of the river so as to remain operative even under changing velocity conditions.

From the above detailed description of preferred embodiments of the invention, it will be evident that a novel method has been described for controlling the course of a highly active river and for protecting a concave bank of the river from undercutting and erosion. Systems of permeable structures have also been described for carrying out the method. A novel structure for retarding current flow has also been described which automatically conforms to changes in the bed of the river to continually remain in operative position adjacent the bed of the river. The novel structure may be employed singly or in clusters in the bed of the river to protect objects in the bed from undercutting and destruction.

Although several preferred embodiments of the invention have been described in detail, it is to be understood that various changes, substitutions and alterations can be made therein without departing from the spirit and scope of the invention as defined by the appended claims.

What is claimed is:

1. The system for moving the course of the thalweg of a curving, sedimentary river having an alluvial bed away from an outside bank toward the opposite bank which comprises: a series of highly permeable, elongated structures disposed on the bed of the river generally at right angles to the normal course of the current to prevent appreciable deflection of the current from its normal course, the structures being disposed at generally uniformly spaced intervals in the direction of current flow with the outer ends thereof located along a line generally defining the edge of the desired course of the thalweg between said line and the opposite bank, said line also defining a control zone between said line and the outside bank, and a plurality of highly permeable elongated structures disposed on the bed of the river within the control zone and spaced from said line toward the outside bank such that the velocity of the current passing through the control zone will be retarded and current over the remaining portion of the river bed will be increased at higher water stages without materially changing the course of current through either the control zone or over the remaining portion of the bed during higher water stages of the river whereby the remaining portion of the bed will be eroded and deepened and sediment will be deposited in the control zone during subsequent high water stages to relocate the thalweg and thereby protect the outside bank from undercutting and erosion.

2. The system defined in claim 1 wherein the plurality of highly permeable structures disposed on the bed of the river within the control zone are extensions of the structures disposed along the line and extend substantially to the bank.

3. The system defined in claim 1 wherein the structures disposed along the line rest on the bed of the river and lower as the structures are undercut by the river.

4. The system defined in claim 3 wherein the structures are flexible and tend to conform to the bed of the river as it changes in contour due to erosion.

5. The system defined in claim 1 wherein the highly permeable, elongated structures have a permeability greater than about 40% and less than about 80%.

6. The system defined in claim 1 wherein the highly permeable structures disposed along the line are comprised of:
  a plurality of rigid elongated members disposed in spaced, generally-parallel relationship and interconnected by rigid cross members extending transversely of the spaced members to form a generally planar panel, and
  means embedded in the bed of the river for holding each of the panels in position against the force of the current.

7. The system defined in claim 6 wherein:
  the plurality of elongated members are pivotally connected to the cross members and the cross members are disposed parallel such that the elongated members form a series of parallelograms with the cross members whereby the structures will conform to the bed of the river,
  the panels have a specific gravity greater than that of the water, and
  the means for holding the panel in place against the current comprises a plurality of pilings driven into the bed of the river on the downstream side of each panel and bracket means slidably connecting the respective panels to the respective pilings whereby the panel will slide downwardly along the pilings and conform to the contour of the bed.

8. A device for retarding current flow velocity adjacent the bed of a river which comprises:
  a panel comprised of a plurality of spaced elongated members interconnected by a plurality of spaced cross members, and having openings constituting at least forty percent (40%) of the total frontage area and having an average density greater than that of water, and
  a pair of pilings driven into the bed of the river and disposed on the downstream side of the panel for retaining the panel in position against the force of the current, the panel being connected to at least one of the pilings by a sliding connection and to the other by a movable connection which will permit at least one end of the panel to rest on the bed of the river as the panel is undercut by the current.

9. A device as defined in claim 8 in which the elongated members are disposed substantially parallel, the cross members are disposed substantially parallel, and the elongated members are connected to the cross members by pivot means whereby the panel will de-form into a parallelogram-like structure to automatically conform to the slope of the bed of the river.

10. A device as defined in claim 9 in which the panel is slidably connected to both pilings.

11. The method for controlling the course of the thalweg of a curving river having a sedimentary bed extending between a relatively high outside bank adjacent which is normally located the thalweg of the river during high water and an opposite, relatively high inside bank adjacent which is normally located a shallow portion of the river as a result of sedimentary deposits which comprises: defining a control zone in the bed of the river including a portion of the existing thalweg if required, the edge of the control zone defining the edge of the desired new course of the thalweg and extending substantially from a point upstream of the river where the thalweg is in a suitable location to substantially a point downstream where the thalweg is in a suitable location and defining a generally smooth, normal course for the thalweg, and installing permeable structures along said edge of the control zone normal to the current flow and within the control zone to reduce the normal flow velocity within the control zone adjacent the bed during all water stages without significantly altering the normal course of water over the control zone during higher water stages such that during subsequent higher water stages of the river the velocity of the current along the edge of the control zone will be increased and the bed of the river will be deepened between the edge of the control zone and the inside bank and the velocity of current in the control zone will be decreased and sediment will be deposited on the bed of the river within the control zone whereby the thalweg will be permanently relocated between the control zone and the inside bank, and the outside bank will be stabilized and protected from undercutting and erosion.

12. The method for shaping the cross-sectional configuration of the alluvial bed of a sedimentary river defined by opposite high banks which comprises: defining a control zone on the bed of the river within which it is desired to increase the elevation of the bed, at least one edge of the control zone generally defining a naturally smooth course for a deepened portion of the bed from the upstream end of the control zone to the downstream end, and installing a series of highly permeable structures on the bed of the river along the edge of the control zone normal to the current flow and within the control zone to reduce the normal flow velocity within the control zone during all water stages without significantly altering the normal course of water over the bed, including the control zone, during high water stages such that during subsequent higher water stages of the river the velocity of current within the control zone will be decreased and sediment will be deposited on the bed of the river within the control zone and the velocity of the current along the edge of the control zone and generally over the uncontrolled portion of the bed will be increased and the bed of the river will be eroded and the river deepened along the edge of the control zone and the remaining uncontrolled portion of the bed.

13. The method for slowing the flow velocity of the current adjacent the bed of a sedimentary river which comprises anchoring a highly permeable elongated structure substantially normal to the flow of the current and on the bed and maintaining the structure substantially normal to the flow of current and on the bed as the bed is cut from under the structure until an equilibrium condition is established.

References Cited
UNITED STATES PATENTS

| | | | |
|---|---|---|---|
| 449,185 | 3/1891 | Solomon | 61—3 |
| 534,919 | 2/1895 | Sewell | 61—3 X |
| 975,551 | 11/1910 | Maher | 61—3 |
| 1,031,077 | 7/1912 | Maher et al. | 61—3 |
| 1,858,976 | 5/1932 | Thornley | 61—3 |
| 2,099,249 | 11/1937 | Wood | 61—4 |
| 2,341,515 | 2/1944 | Rehfeld | 61—3 |

OTHER REFERENCES

Engineering News-Record (pub.) of Aug. 3, 1933, pp. 133 to 136.

DAVID J. WILLIAMOWSKY, *Primary Examiner.*

JACOB SHAPIRO, *Examiner.*